UNITED STATES PATENT OFFICE.

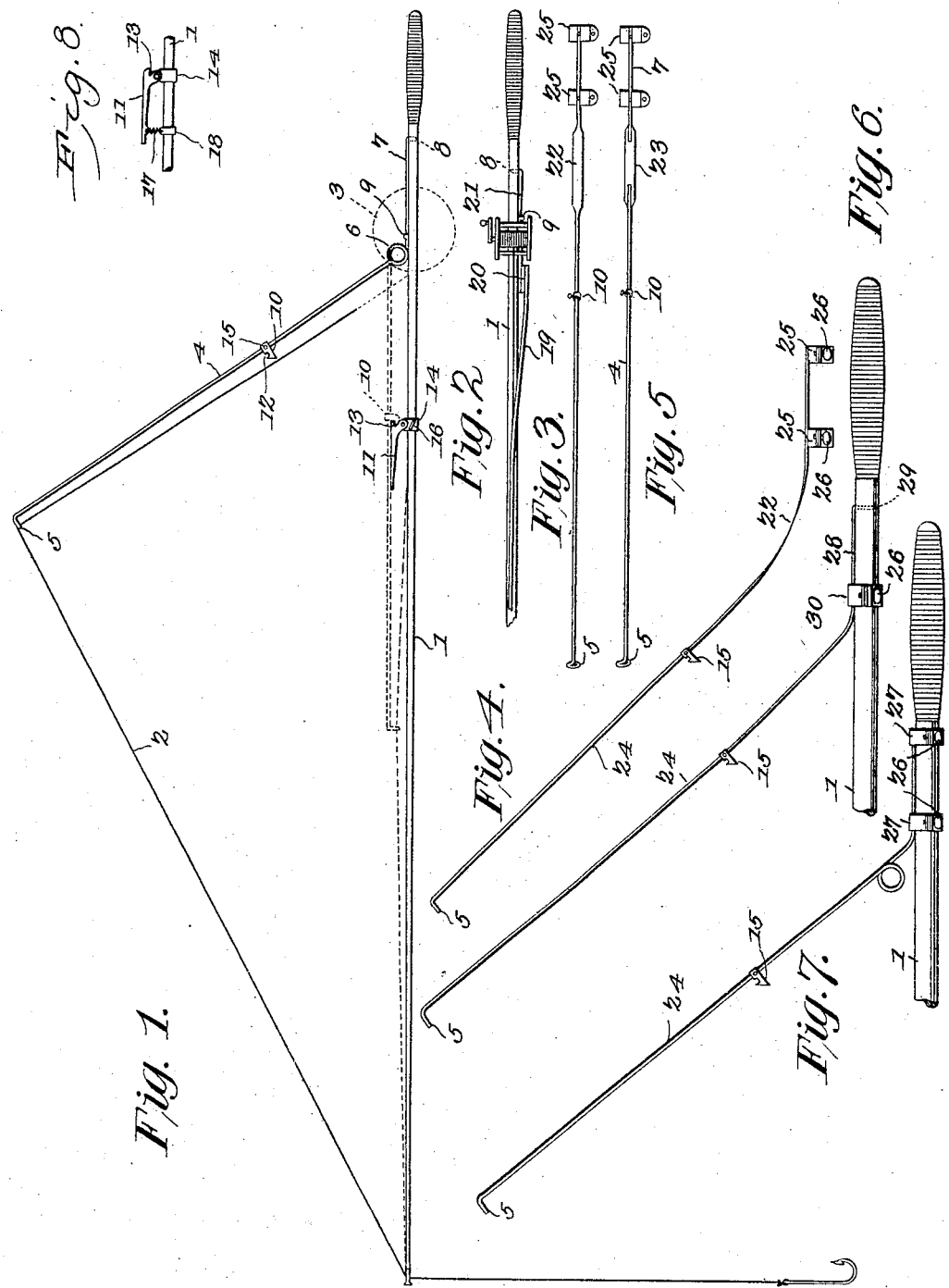

JONATHAN B. TUTTLE, OF CLAREMONT, CALIFORNIA.

FISHING-ROD.

No. 796,948.

Specification of Letters Patent.

Patented Aug. 8, 1905.

Application filed September 19, 1904. Serial No. 225,014.

*To all whom it may concern:*

Be it known that I, JONATHAN B. TUTTLE, a citizen of the United States, residing at Claremont, in the county of Los Angeles and State of California, have invented a new and useful Fishing-Rod, of which the following is a specification.

This invention relates to fishing-rods.

The object of the invention is in a simple, ready, certain, and thoroughly practical manner to effect setting of the hook in a fish's mouth when the bait on the hook is disturbed or to snag a fish should it take the bait when placed above the hook.

With the above and other objects in view, as will appear as the nature of the invention is better understood, the same consists in the novel construction and combination of parts of a hook-setting attachment for fishing-rods, as will be hereinafter fully described and claimed.

In the accompanying drawings, forming a part of this specification, and in which like characters of reference indicate corresponding parts, there are illustrated six forms of embodiment of the invention, each capable of carrying the same into practical operation, it being understood that the elements therein exhibited may be varied or changed as to shape, proportion, and exact manner of assemblage without departing from the spirit thereof.

In the drawings, Figure 1 is a view in elevation of a fishing-rod with one form of the hook-setting device combined therewith. Fig. 2 is a view in plan of a portion of a fishing-rod, showing a modified form of the invention combined therewith. Figs. 3 and 4 are detached detail views in plan and in elevation, respectively, of another form of the invention. Fig. 5 is a detached detail view in plan of still another form of the invention. Fig. 6 is a view in elevation of a portion of a fishing-rod with which is combined a still further modified form of the invention. Fig. 7 is a view similar to Fig. 6, exhibiting still another modified form of the invention. Fig. 8 is a detached detail view of a part of the setting mechanism.

Referring to drawings and to Fig. 1 thereof, 1 designates a fishing-rod, which may be of the usual or any preferred construction, 2 the line, and 3 a reel. (Indicated by dotted lines and shown disposed at one side of the rod.) The hook-setting device, which constitutes the gist of the present invention, comprises an arm or hook-setting member 4, which is made of spring-wire and is provided at its free or outer end with a line-guide 5, which in this instance is formed by bending the wire of the member to form an eye. While this manner of constructing the eye will generally be preferred on account of its simplicity and cheapness, it is to be understood that the invention is not to be limited thereto, as the guide may be a separate element and combined with the member in any practical manner. At a point intermediate of the ends of the setting member the wire is formed into a series of coils 6, (more clearly shown in Fig. 2,) the direction of the turns of the whirls being such as to cause the setting member normally to be flexed away from the rod and to maintain a position substantially the same as those shown in Figs. 1, 4, 6, and 7. The length of wire 7, projecting beyond the coils 6 and which constitutes an attaching member, is in part secured to the handle of the rod in this instance by providing its terminal with a prong 8, which may be driven through the handle and have its projecting end clenched or upset to hold it positively combined with the rod, the attachment being further strengthened by a staple 9, located adjacent to the coils 6.

To render the device operable, it is necessary that the setting member when flexed should be held in the position shown by dotted lines in Fig. 1, and to effect this result there is a suitable setting or locking mechanism provided which is mounted upon the rod convenient to the hand of the angler and consisting of a dog 10, carried by the setting member, and a sear 11, carried by the rod. The dog is provided with a tooth 12 to engage a notch 13 on the sear, thus to hold the setting member in operative position. The sear is pivotally mounted upon a collar 14 and has a forwardly-projecting portion constituting a counterweight which operates when draft is applied to the line to cause the setting member to be moved toward the rod, thus to effect automatic release of the sear from the dog and permit the setting member to spring to the position shown in Fig. 1. The counterweight subserves a further function of holding the sear in locked engagement with the dog when the hook is withdrawn from the water either for the purpose of rebaiting or for recasting, as under ordinary circumstances when the angler is not fishing on the bottom the weight of the sinker would be sufficient to cause release of the sear, and, further, in the act of casting the same result would ensue. To prevent this under either of the above conditions, the angler merely slips his thumb or finger under the counterweight and holds the sear in engagement with the dog. The sear may be constructed without a counterweight in case it is not desired to effect automatic release of the sear from the dog, in which case the release would be effected by pressure on the sear by the thumb or finger or by any other means.

In order to vary the sensitiveness of the setting means, thus to increase or diminish the strain necessary to release it, both the dog and the sear are mounted for longitudinal adjustment upon the members with which they coact and are held in their adjusted positions by set-screws or bolts 15 and 16, respectively. Ordinarily the counterweight will be sufficient to cause the sear to release the dog when the bait is taken; but under some conditions it may be desired to assist the counterweight in its action, and to effect this a weak coiled spring 17 is employed, as shown in Fig. 8, one end of which is operatively connected to the terminal of the counterweight and the other end to a collar 18, mounted upon the rod. While for the reason stated it will generally be advantageous to have the dog and sear mounted for adjustment, it is to be understood that, if preferred, these parts may have a fixed relation with the setting member and the rod, respectively, and still be within the scope of the invention.

As shown in Fig. 1, the attaching member 7 is disposed on the upper side of the rod, and this arrangement necessitates the positioning of the reel 3 on one side of the rod; but should it be preferred to position the reel upon the upper side of the rod, as shown in Fig. 2, the rear portion of the setting member 19 may be bent laterally to throw the coils 20 to one side of its forward portion, and the attaching member 21 will be secured to the side of the rod.

Under some conditions it may be desired to dispense with the coils 6 and 20, and this may be secured, as shown in Figs. 3 and 4, by transversely flattening the setting member adjacent to the attaching member, as shown at 22, or, as shown in Fig. 5, a spring-section 23 may be brazed or otherwise secured to the opposite terminals of the setting and attaching members. These two last-described arrangements will be found thoroughly effective for the purposes designed and will result in the presentation of a neat and inexpensive attachment. If preferred, both the coils and flattened spring-sections may be dispensed with, and the attachment 24 may be made of a length of spring-wire which is flexed to give it the desired spring action, as shown in Fig. 6.

While the manner of securing the attaching member to the handle, as shown in Figs. 1 and 2—that is to say, by the employment of prongs 8 and staples 9—will be found thoroughly effective for the purposes designed, it might under some conditions be found objectionable, for the reason that such manner of attachment is permanent and will not, therefore, permit any shifting of the attachment upon the rod. To obviate this objection, the attachment may be held in position by split collars 25, as shown in Figs. 3, 4, and 5, which are secured to the attaching members by being brazed or riveted thereto, thumb-screws or bolts 26 being provided to clamp the collars at any desired point of adjustment on the rod. Of course it will be understood that the collars may not be split, as they may be made continuous and be held at any desired adjustment by a screw or nail passed through them and into the rod. Instead of having the collars secured to the attachment, as shown in the figures above referred to, they may operate to clamp the attaching member to the rod, as shown at 27 in Fig. 7. A still further manner of securing the attachment in position is shown in Fig. 6, wherein the terminal of the attaching member 28 is provided with a prong 29, which is seated in the rod, a collar 30 being employed to clamp the attaching member adjacent to its bend to the rod.

It will be seen from the foregoing illustrations and description that the invention may be carried into effect in various ways, those herein shown being a few of many that may be employed in securing the objects sought. It is therefore to be understood that the invention is not to be limited to the precise forms herein shown, as its scope is sufficient to embrace other devices for carrying it into effect.

Having thus fully described my invention, what I claim as new, and desire to secure by Letters Patent, is—

1. A device of the class described comprising a normally flexed hook-setting member, and manually-controlled means to hold the member in unflexed position.

2. A device of the class described comprising a normally flexed hook-setting member, and manually-controlled means to hold the member in unflexed position and to effect its automatic release when strain is applied to the member.

3. A device of the class described comprising an attaching member, a hook-setting member including a line-guide, manually-controlled means to lock the setting member in operative position.

4. A device of the class described comprising an attaching member and means to combine the same with a rod, a hook-setting member including a line-guide, and manually-controlled means to set the latter member.

5. The combination with a rod of a hook-setting attachment comprising a normally flexed member including a line-guide, a dog carried by the member, and a sear carried by the rod to engage the dog and operable by the hand of the angler.

6. The combination with a rod of a normally flexed hook-setting attachment including a line-guide, a dog adjustably mounted on the member, and a sear adjustably mounted on the rod to engage the dog to hold the attachment in operative position.

In testimony that I claim the foregoing as my own I have hereto affixed my signature in the presence of two witnesses.

JONATHAN B. TUTTLE.

Witnesses:
 ROA EVANS,
 C. A. STURTEVANT.